//s US005650675A

United States Patent [19]

Kanaya et al.

[11] Patent Number: 5,650,675
[45] Date of Patent: Jul. 22, 1997

[54] ROTARY ELECTRIC MACHINE HAVING VARIABLY-DIMENSIONED HOUSING VENTILATION HOLES

[75] Inventors: Kazuyoshi Kanaya, Kariya; Hirofumi Fujimoto, Obu; Hiroshi Sakakibara, Chita-gun, all of Japan

[73] Assignee: Nippondenso Co., Ltd., Kariya, Japan

[21] Appl. No.: 274,815

[22] Filed: Jul. 14, 1994

[30] Foreign Application Priority Data

Jul. 15, 1993 [JP] Japan ................................. 5-175341
Apr. 28, 1994 [JP] Japan ................................. 6-090983

[51] Int. Cl.$^6$ .............................. H02K 9/00; H02K 9/06; H02K 5/24; H02K 5/20
[52] U.S. Cl. ............................... 310/58; 310/51; 310/89
[58] Field of Search ........................... 310/51, 58, 62, 310/63, 89; 415/119, 195, 203, 206, 207; 181/202

[56] References Cited

U.S. PATENT DOCUMENTS

| | | | |
|---|---|---|---|
| 1,136,142 | 4/1915 | Kerr | 415/208.2 |
| 1,534,721 | 4/1925 | Lasche | 415/195 |
| 2,157,002 | 5/1939 | Moss | 415/195 |
| 2,291,478 | 7/1942 | La Bour | 415/206 |
| 2,439,933 | 4/1948 | Jenkins | 310/63 |
| 3,973,872 | 8/1976 | Seleznev et al. | 415/211 |
| 5,095,235 | 3/1992 | Kitamura | 310/62 |

FOREIGN PATENT DOCUMENTS

| | | |
|---|---|---|
| 401034 | 12/1990 | European Pat. Off. . |
| 539339 | 4/1993 | European Pat. Off. . |
| 2602924 | 2/1988 | France . |
| 4038663 | 6/1991 | Germany . |
| 57-6551 | 1/1982 | Japan . |
| 57-186168 | 10/1982 | Japan . |
| 62-140867 | 9/1987 | Japan . |
| 2174533 | 7/1990 | Japan . |

*Primary Examiner*—Clayton E. LaBalle
*Attorney, Agent, or Firm*—Cushman, Darby & Cushman IP Group of Pillsbury Madison & Sutro LLP

[57] ABSTRACT

A vehicle alternating current generator increasing the flow of cooling air therethrough and reduces whizzing sounds from cooling windows surrounding the generator's fan. This is done by inclining guide walls separating the cooling windows so that the angle of inclination thereof in the radial direction of the generator is larger the closer the windows are to the forward edge of the housing supports and smaller the closer the windows are to the backward edge of the housing supports. Also, the cooling windows narrow the closer they are to the supports, and are widest in the middle between two adjacent supports. Further, the axial length of the windows may be shorter the closer they are to the supports, and longer in the middle between two adjacent supports.

9 Claims, 6 Drawing Sheets

FIG. 8
PRIOR ART

ROTARY ELECTRIC MACHINE HAVING VARIABLY-DIMENSIONED HOUSING VENTILATION HOLES

BACKGROUND OF THE INVENTION

1. Field of the Invention

The present invention generally relates to a rotary electric machine such as an alternating current generator for vehicles and, more particularly, to a cooling mechanism of such a rotary electric machine.

2. Description of Related Art

Figure 8:
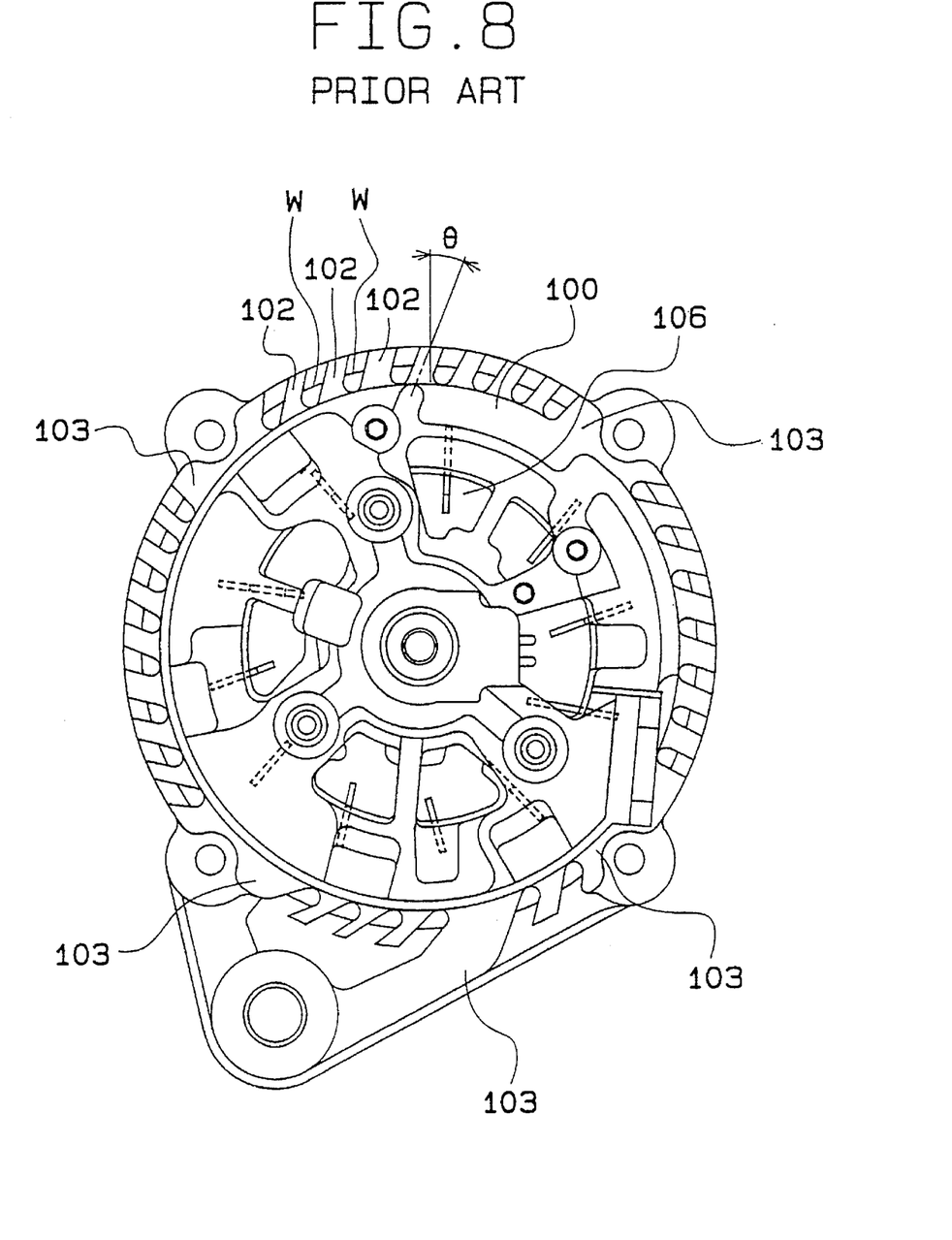
FIG. 8 is a front view viewed from the rear side of a conventional generator with a cover and electric components removed therefrom.

As an example of conventional rotary electric machines, Japanese Unexamined Patent Publication No. 3-178539 discloses an alternating current generator as illustrated in FIG. 8. This alternating current generator includes a housing 100 with a plurality of cooling windows w formed in a cylindrical peripheral wall and circumferentially aligned in a row, and a centrifugal fan 106 positioned inside the cooling windows w and fixed to the end of a rotor (not illustrated) in the housing 100. The peripheral wall of the housing 100 has guide wall parts 102, each of which is positioned between circumferentially adjacent ones of the cooling windows w and axially extends therebetween. Each guide wall part 102 is inclined at a constant angle θ against the radial direction, so that the cooling wind blown out of the cooling windows w is blown out in this inclined direction. Between the two cooling windows w circumferentially adjacent to each other axially extends support parts 103 and the circumferential width of each support part 103 is made to be wider than the circumferential width of the guide wall part 102.

In the above conventional rotary electric machine, the support parts 103 result in large fluid resistances against cooling wind generated by the centrifugal fan 106, causing increase in fluid loss, decrease in cooling ability or increase in whizzing sound.

SUMMARY OF THE INVENTION

It is an object of the present invention to solve the above problem by providing a rotary electric machine which can increase the cooling flow quantity without any further addition of power.

It is a further object of the present invention to reduce whizzing sound in the rotary electric machine.

According to one aspect of a rotary electric machine according to the present invention, the angle of inclination of guide wall parts formed on a periphery of a cylindrical housing against the radial direction is set to be larger in the vicinity of the forward end of each support part in the rotating direction and smaller in the vicinity of the backward end of the support part in the rotating direction.

Preferably, the angle of inclination of the guide wall parts is set to become gradually smaller from the vicinity of the forward end of the support part in the rotating direction towards the vicinity of the backward end of the support part in the rotating direction, whereby the cooling flow quantity can be increased and whizzing sound can be reduced.

More preferably, chord direction (blade length direction) of the guide wall parts is in the same direction as that of the cooling wind flowing into the cooling windows at the rotational speed at which the temperature of the blown air is the highest in a full-load operation. Thus fluid resistance at the guide wall parts under the worst conditions can be minimized, and the cooling flow quantity can be increased under the worst conditions. That is, the worst heat load in the rotary electric machine is generated in the preset rotational speed range in a full-load operation. In other words, the electric generating power, the internal radiating resistance and the cooling flow quantity vary according to the rotational speed, and the difference (internal temperature rise) between the internal heat generation quantity and heat radiation quantity (which can be generally regarded as the cooling flow quantity) is the largest within the preset rotational speed range.

Still more preferably, the cooling windows are formed on the housing to extend from the peripheral wall of the housing to the end part thereof in the axial direction. Thus, a plurality of cooling windows can deliver the cooled air more smoothly.

According to another aspect of the rotary electric machine according to the present invention, circumferential width of the cooling windows is set to be larger in the intermediate area between the adjacent two support parts than any other area.

Preferably, the circumferential width of the plurality of cooling windows is set to become gradually larger from the vicinity of each support part toward the intermediate area between the adjacent two support parts. Thus, the circumferential width of each cooling window can almost match with the flow quantity therethrough, whereby the fluid resistance can be further reduced and whizzing noise can be further reduced.

More preferably, the axial length of the cooling windows is set to be longer in the intermediate area between the adjacent support parts than any other area. Thus the increase in the fluid resistance can be controlled, the noise generated within the housing can effectively be shut off, and the strength around the support parts can be increased. By setting the axial length of the plurality of cooling windows to become gradually longer from the vicinity of each support part to the intermediate area between the adjacent support parts, the axial length of each cooling window can match the flow quantity therethrough.

Alternatively, the axial length of the plurality of cooling windows may be set to be equal so that the mechanism can be simplified and the cooling flow quantity can be increased.

According to the above characteristic features, cooling wind blown from the centrifugal fan flows in the direction of inclination of the guide parts against the radial and circumferential directions. However, the wind that bumps the support part is bent thereby in the circumferential direction, and as a result, the component of wind velocity in the circumferential direction in the vicinity of the forward end of the support in the rotating direction increases by the addition of the cooling wind that bumped the support part and was bent thereby in the circumferential direction. Accordingly, the fluid resistance at the guide wall part can be reduced, the effect of flow control can be improved, and the cooling flow quantity can be increased.

Further, the fluid resistance to the cooling wind blown from the centrifugal fan is large in the vicinity of the support part due to the interruption by the support parts and small in the intermediate area between the support parts due to the concentration of a numerous cooling windows therein. The quantity of the wind blown from the cooling window is small in the vicinity of the support part and large in the distance from the support part. Accordingly, overall fluid resistance is appropriately reduced and the cooling flow quantity can be increased.

DETAILED DESCRIPTION OF THE PREFERRED EMBODIMENTS

Description will now be made of an alternating current generator for vehicles as a rotary electric machine according to a first preferred embodiment of the present invention, referring to FIGS. 1, 2 and 3.

Figure 1:
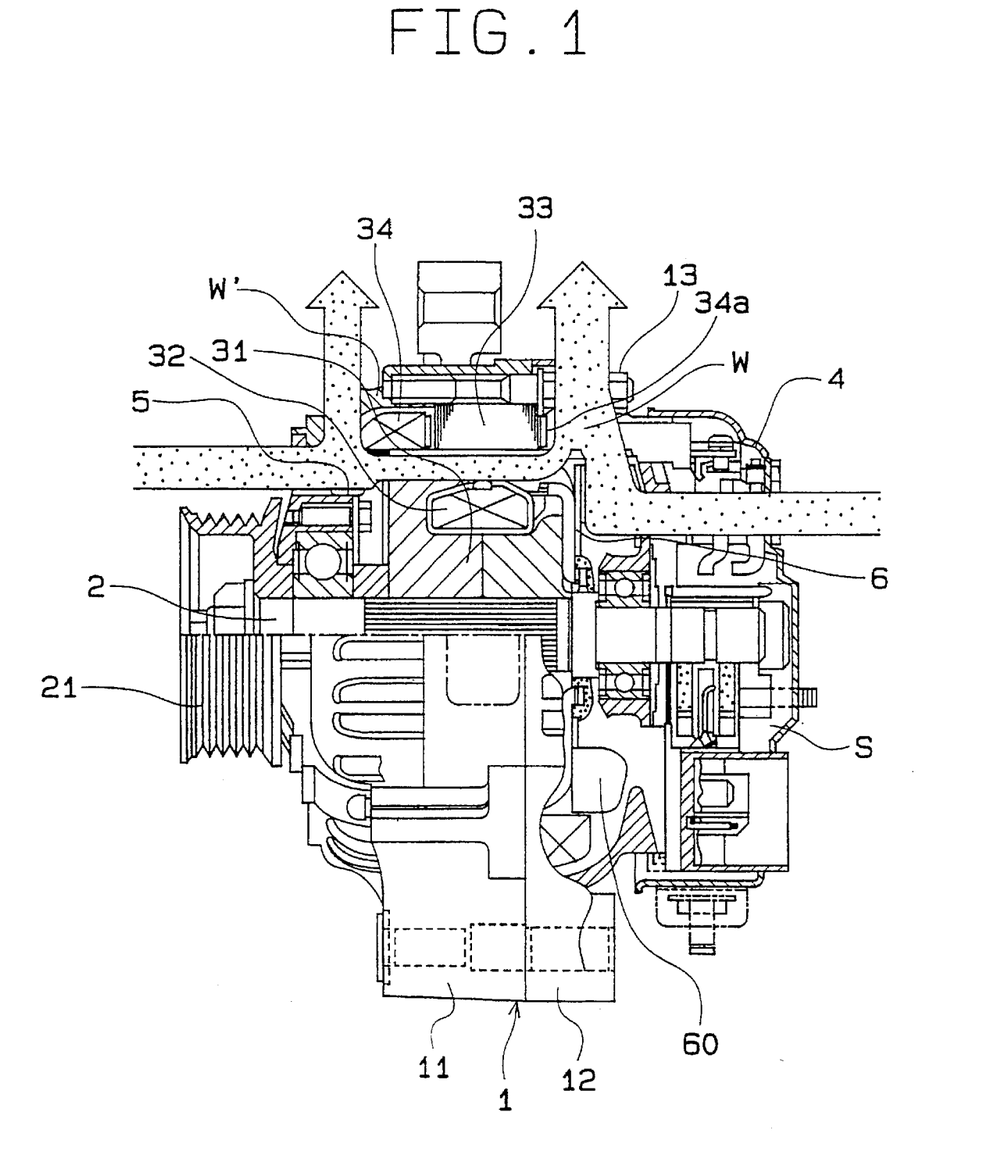
FIG. 1 is a cross-sectional view illustrating an alternating current generator for vehicles according to a first embodiment of the present invention.

As illustrated in FIG. 1, a frame (or a generally cylindrical housing as referred to in the present invention) 1 comprises a front frame 11 and a rear frame 12 which are fastened to each other with fastening bolts 13. The frame 1 rotatably supports a rotary shaft or spindle 2 to which a field core 31 is fixed and the field core 31 is wound with a field coil 32 thereon. The field core 31 and the field coil 32 form a rotor of an alternating current generator. Inside of the frame 1, an armature core 33 circumferentially surrounding the field core 31 is fixed and the armature core 33 is wound with an armature coil 34 thereon. The armature core 33 and the armature coil 34 form a stator of the generator.

An end cover 4 is fixed, covering the rear end face of the rear frame 12, and an electric component chamber S is formed between the rear frame 12 and the cover 4. The electric component chamber S houses therein a rectifier mounted by bolts 10, a brush and a regulator (these components being not illustrated).

When the spindle 2 is belt-driven by an engine through a pulley 21 and, at the same time, the field coil 32 is electrically energized for excitation, a three-phase alternating current (AC) voltage generated in the armature coil 34 is subjected to three-phase full-wave rectification by the rectifier and then outputted for charging a battery.

Figure 2:
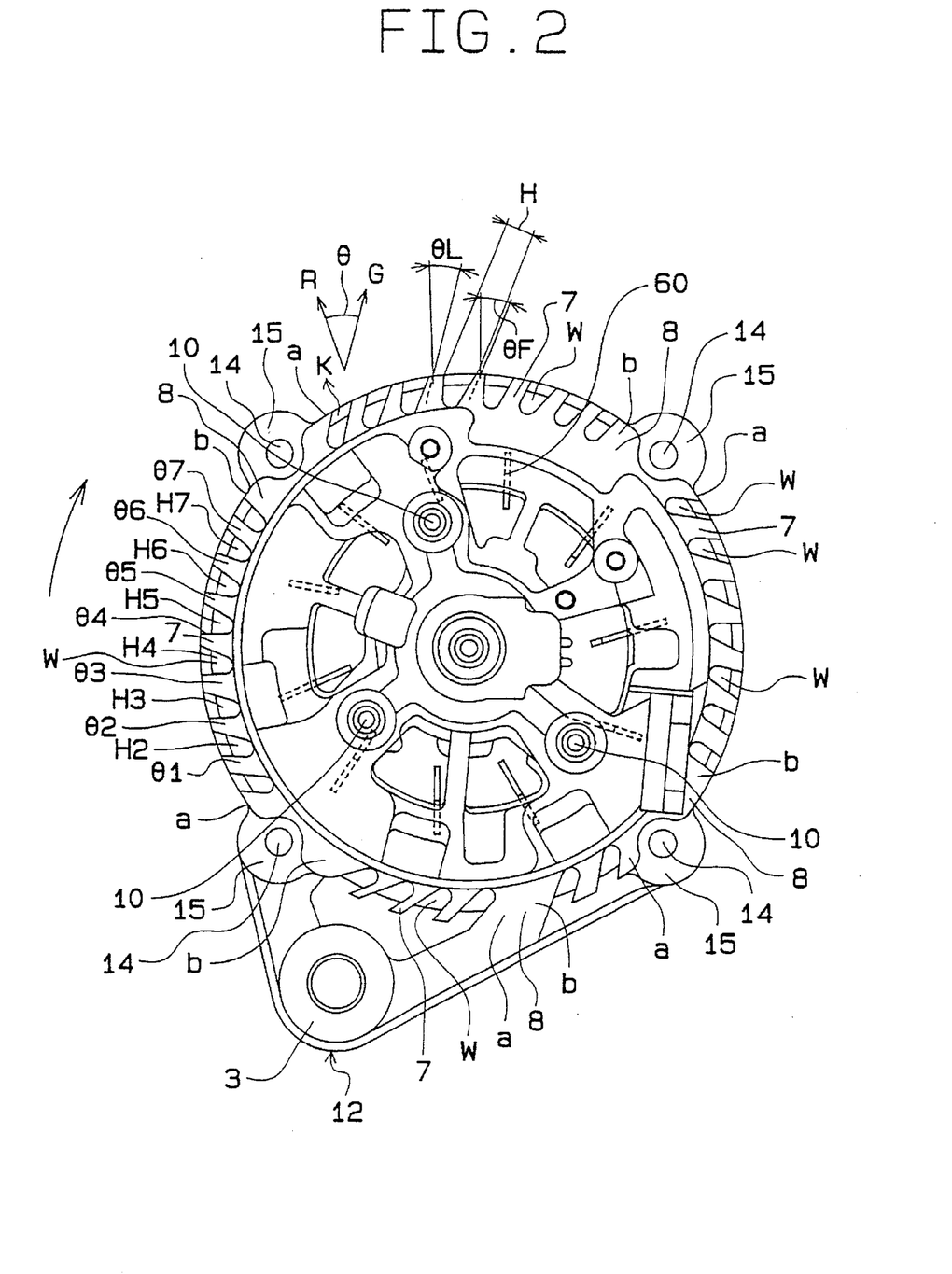
FIG. 2 is a front view viewed from the rear side of the generator of FIG. 1 with a cover and electric components removed therefrom.

The characteristic parts of this embodiment will now be described with reference to a cross-sectional view of FIG. 1 and a front view of FIG. 2 illustrating an end surface of the rear frame 12 with the cover 4 removed therefrom.

Fixed to the spindle 2 for rotation therewith and generation of cooling wind thereby are an inclined flow fan 5 and a centrifugal fan 6 sandwiching the field core 31 therebetween. Around the peripheral wall of the front frame 11 are numerous cooling windows w' opened in a circumferential alignment. On the other hand, around the peripheral wall of the rear frame 12 are numerous of cooling windows w opened in a circumferential alignment encompassing blades 60 of the centrifugal fan 6.

Part of the wind generated by the inclined flow fan 5 is blown out of the cooling windows w', and the remaining part of the same wind flows axially along the outer periphery of the field core 31 to the rear side and then blown out of the cooling windows w in centrifugal directions.

Figure 3:
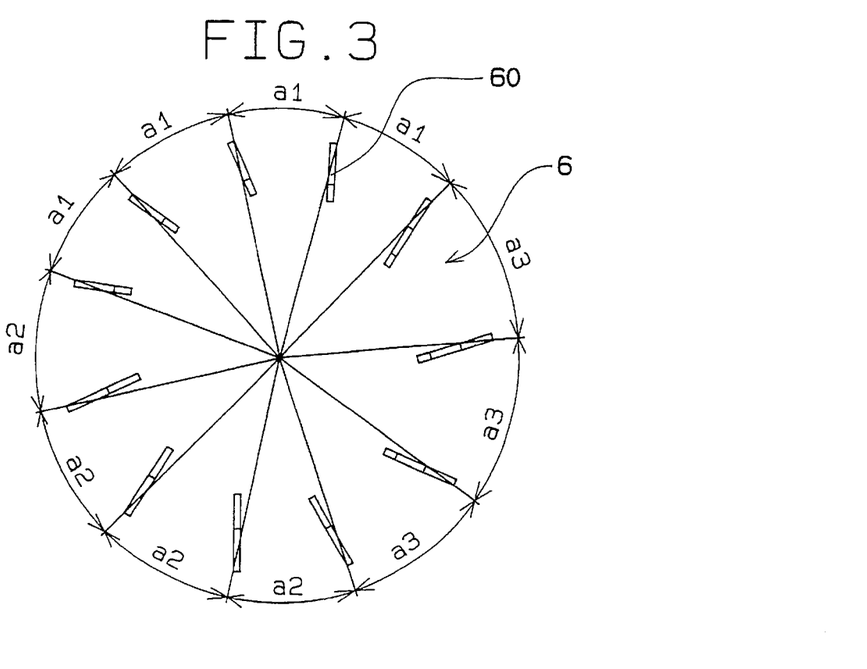
FIG. 3 is a diagram illustrating the layout of the blades of a rear side fan according to the first embodiment.

The blades 60 of the centrifugal fan 6 are positioned at irregular pitches or angular spaces as illustrated in FIG. 3, i.e., four blades are positioned at a pitch a1, another four blades at a pitch a2, and the remaining three blades at a pitch a3, wherein a1<a2<a3. The wind generated by the centrifugal fan 6 is blown out of the cooling windows w in centrifugal directions.

The peripheral area of the cooling windows w will now be described with reference to FIG. 2.

Each of cooling windows w is provided between circumferentially adjacent guide wall parts 7 as a circumferential border to define the direction of the wind blowing out of the cooling windows w.

The guide wall parts 7 are integrally cast with the rear frame 12 to be a flat plate with the inner peripheral end part (blade front tip part) and the outer peripheral end (blade rear tip part) rounded. Here, the dimension between the inner peripheral end (blade front tip end) and the outer peripheral end (blade rear tip end) is called chord length or blade length.

Both the principal planes of the guide wall parts 7 are parallel with each other in the axial direction and almost flat planes inclined against the radial and circumferential directions. Accordingly, between two adjacent guide wall parts 7 is the cooling window w, and the circumferential width H of each cooling window w is measured at right angles to the mean angle $\theta m$ of the angles $\theta L$ and $\theta F$ $\{=(\theta L+\theta F)/2\}$ between the chord direction G and radial direction R of the two adjacent guide wall parts 7 contacting the cooling window w. Here, each chord direction G is the mean value of the angles of inclination of both the principal planes of the guide wall part 7 facing each other.

Formed between some of the cooling windows w circumferentially adjacent to each other are support parts 8. The support parts 8 are provided at five locations at intervals in the circumferential direction. The circumferential width thereof is set to 2 to be 5 times as wide as the sum of the circumferential widths of one guide wall 7 and one cooling window w. As illustrated in FIGS. 1 and 2, the support parts 8 are disposed beneath the fastening bolts 13 and one support part 8 in the supporting position for a stay 3. Bolt holes 14 through which the fastening bolts 13 are screwed in are made in ear parts 15 of the rear frame 12, the ear parts 15 projecting in the outside diameter direction. Each ear part 15 extends in the outside diameter direction from the front end of each support part 8. Accordingly, the support parts 8 function to transmit the fastening force of the fastening bolts 13 to the entire rear frame 12.

The characteristics of this first embodiment will now be described.

In this embodiment, the angle (the angle of inclination as referred to in the present invention) $\theta$ between the chord direction G and radial direction R of the guide wall part 7 is set to be larger (more inclined in the circumferential or rotating direction) as the guide wall part 7 is nearer in the rotating direction to the forward end a of each support part 8 and smaller (closer to the radial direction R) as the guide 5 wall part 7 is nearer in the rotating direction to the backward end b of each support part 8 as θ1>θ2>θ3>θ4>θ5>θ6>θ7, for example.

In the above arrangement, the cooling wind is blown out with slight inclination against the circumferential direction nearby the forward end of the support part 8 in the rotating direction and with slight inclination against the radial direction near the backward end of the support 8 in the rotating direction. In other words, the cooling wind flows with inclination against the radial and circumferential directions. However, the wind bumping the support part 8 is bent thereby to the circumferential direction, and as a result, the component of velocity of the cooling wind in the circumferential direction near the forward end a of the support part 8 in the rotating direction increases by the addition of the cooling wind which bumped the support part 8 and was bent thereby in the circumferential direction. In short, the wind blown out of the cooling window w is more inclined in the circumferential direction as the wind approaches the forward end a of the support part 8 in the rotating direction.

As the chord direction of each guide wall part 7 is gradually varied according to the variation in the cooling wind direction caused by the support parts 8, the cooling wind bumped at the support parts 8 is easily blown out through the guide wall parts 7 near the forward end a. Thus the fluid resistance of each guide wall part 7 can be reduced, the effect of flow control can be improved, and the cooling wind flow quantity can be increased.

Also in this embodiment, the circumferential width H of each cooling window w is set to be narrower in the vicinity of the support part 8 and wider in the distance from the support part 8 as H2<H3<H4>H5>H6>H7, for example.

By this arrangement, the fluid resistance to the wind blown out of the centrifugal fan 6 is large in the vicinity of the support part 8 due to the interruption by the support part 8 and small in the intermediate area between two support parts 8 due to the numerous of cooling windows w concentratedly formed therein. In short, the flow quantity of the cooling wind blown out of the cooling window w is smaller in the vicinity of the support part 8 and larger in the distance from the support part 8. Therefore, since the opening area of the cooling windows w in the distance from the support part 8 is larger than that in the vicinity of the support part 8, the total fluid resistance can be reduced, the difference in the velocity of the cooling wind blown out of each cooling window w can be decreased, and the cooling flow quantity can be increased.

The above embodiment may be so modified that the chord direction (blade length direction) G of the guide wall part 7 is set in the direction K of the cooling wind blown into the cooling window w at the rotational speed at which the temperature of the blown air is the highest in a full-load operation (with the designed maximum allowable electric power supply).

For reference, the rotational speed at which the temperature of the blown air is the highest in a full-load operation (with the designed maximum allowable electric power supply), ntmax, slightly varies according to the type of alternating current generators. In most alternators, such rotational speed ntmax ranges from 3,000 to 4,000 rpm. When the difference between the angle of inclination of the guide wall parts 7 and the inflow angle of the inflow cooling wind is 10 degrees or less, the fluid loss is small, and when the variation in the rotational speed is within a range from 0.8 to 1.2×ntmax, the variation in the cooling wind direction is small. Therefore, when the direction of the cooling wind blown into the cooling windows w coincides with the chord direction (blade length direction) G of the guide wall part 7 (which means that the difference between these two directions is 10 degrees or less) at a rotational speed of 0.8 to 1.2×ntmax, the fluid resistance at the guide wall parts 7 is the smallest under the above operating conditions, whereby the cooling flow quantity can be increased.

Also in this modification, in case the support part 8 is provided, the angle of inclination, etc. of the guide wall parts 7 should be varied like the first embodiment.

It is to be understood that, in each of the above constructions, the whizzing sound can be reduced for a quiet operation.

Figure 4:
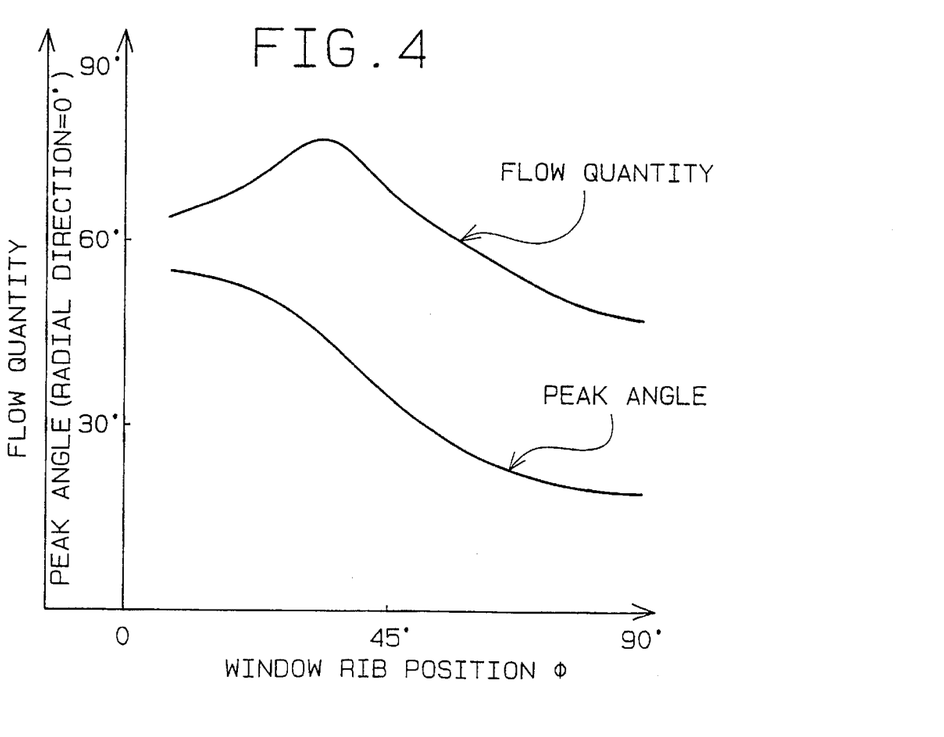
FIG. 4 is a characteristic diagram illustrating the relationship among the flow quantity, direction and the circumferential angle position of the cooling wind blown out of the cooling windows of the generator of FIG. 1.

The results of an experiment are illustrated in FIG. 4.

In this experiment, the cooling wind direction (the direction of the maximum cooling wind velocity referred to as peak angle in FIG. 4) and the cooling flow quantity both in each circumferential angle position Φ against the support part 8, using a model with all the guide wall parts 7 circumferentially dividing the cooling windows w between two support parts 8 in the upper part of FIG. 2 removed. The rotational speed was set to 3500 rpm. The model used in the experiment was an alternating current generator for vehicles with a rated voltage of 12 V and a rated output of 100 A. The positions in the vicinity of 0° and 90° were the positions of the support parts 8.

The significance and advantage of the construction of the above embodiments can be understood from FIG. 4.

Figure 5:
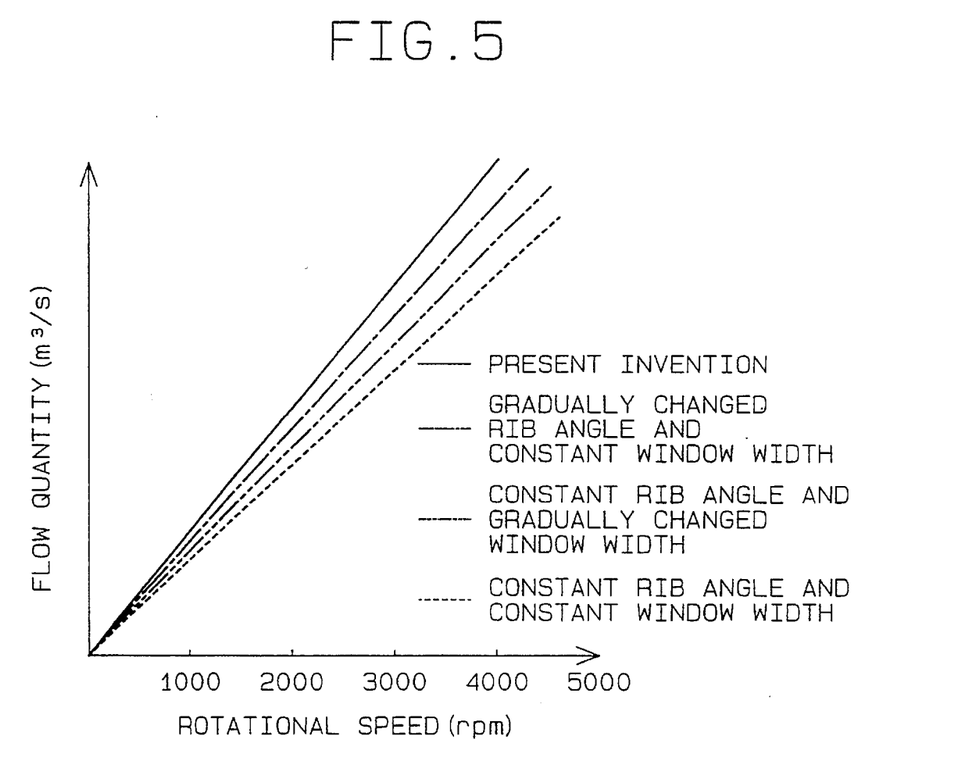
FIG. 5 is a characteristic diagram illustrating the relationship between the rotational speed and the flow quantity of the cooling wind in each embodiment model.

In FIG. 5 which shows relationship between the flow quantity and the rotational speed, the solid line indicates the results of the experiment on the above embodiments. The chain line with one dot indicates the results of the experiment with the angle of the guide wall part (rib) gradually changed and the window width constant. The chain line with two dots indicates the results of the experiment with the rib angle constant and the window width gradually changed. The broken line indicates the results of the experiment on only the above modified embodiment (however, with the angle of inclination of each guide wall part 7 fixed).

The second embodiment will now be described with reference to FIGS. 6 and 7.

In this embodiment, the angle of inclination θ of the guide wall parts 7 is defined as the angle θLB of the wall on the backward end side of the rotating direction. Like the first embodiment, this angle θLB is set to become gradually smaller from the vicinity of the forward end a of the support part 8 towards the backward end b of the support part 8 in the rotating direction. The width of the cooling window w is arranged in the same way as in the first embodiment.

Figure 6:
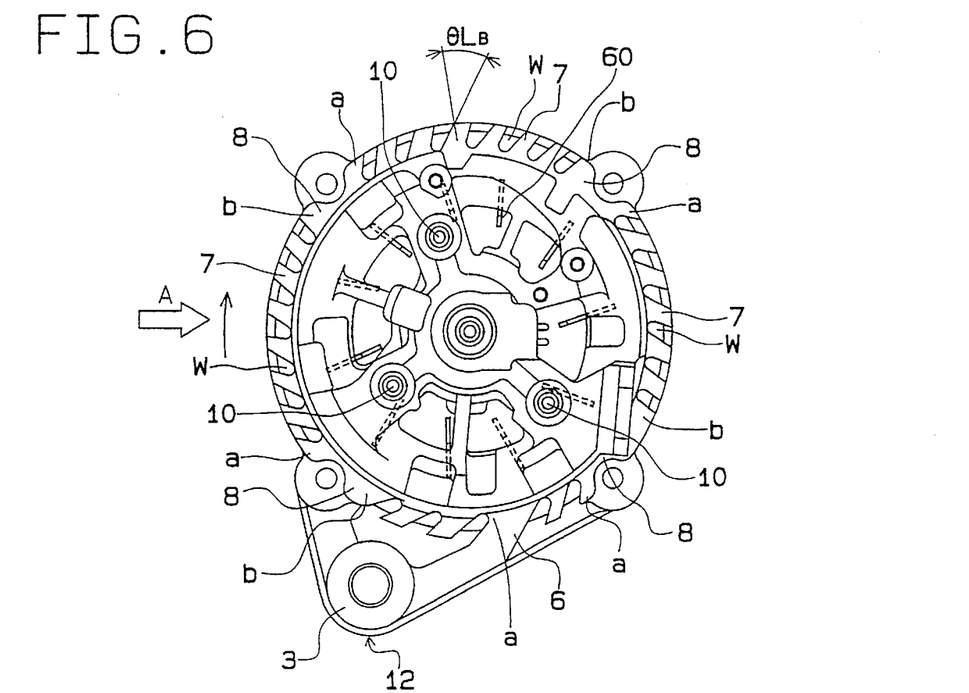
FIG. 6 is a front view illustrating the alternating current generator according to a second embodiment of the present invention viewed from the rear side of the generator with a cover and electric components removed therefrom.
Figure 7:
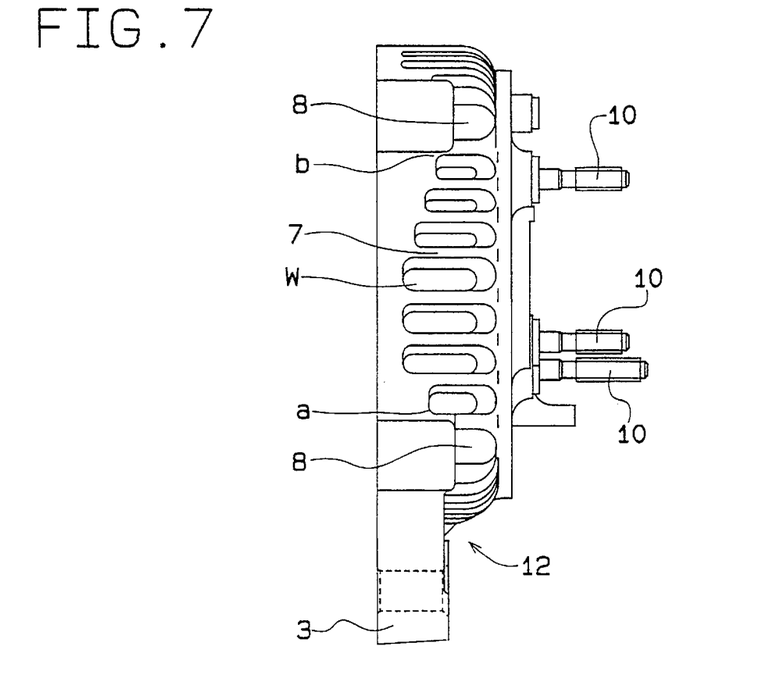
FIG. 7 is a side view viewed in the direction of the arrow A of FIG. 6.

FIG. 7 is a side view viewed in the direction of the arrow A of FIG. 6. The axial length of cooling windows w are set to become gradually longer from the vicinity of the support parts 8 towards the intermediate area between the support parts 8.

By this arrangement, the fluid resistance of each guide wall part 7 can be reduced, the effect of flow control can be improved, and the cooling flow quantity can be increased, as in the above embodiments.

Particularly, the noise generated from the bottom part of the armature coil 34 within the frame 1 can be sufficiently shut off. Furthermore, when the frame 1 is manufactured by die casting, for instance, if the cooling windows w are unconditionally enlarged in an attempt to maximize the cooling ability, the guide wall parts 7 will be narrowed to the extent that they are easily deformed. In particular, the guide wall parts 7 adjacent to the support parts 8 may cause an insufficient run of the molten metal due to sharp change in the width between the guide wall part and the support part 8 and the depth, resulting in insufficient strength. However, this embodiment is free from these problems, allowing very stable casting and substantial improvement in strength.

In this embodiment, it is acceptable to set the axial length of each cooling windows w to be constant.

The present invention having been described hereinabove is not limited to the embodiments but may be modified in many ways. For instance, in the first embodiment and its modification, it is possible to set the axial length of each cooling windows w to become gradually longer from the vicinity of the support part 8 towards the intermediate area between the support parts 8, or otherwise to be constant.

We claim:

1. A rotary electric machine comprising:
   a housing with a plurality of cooling windows opened in a cylindrical peripheral wall thereof in circumferential alignment;
   a stator fixed to said housing;
   a rotor rotatably supported in said stator by said housing; and
   a centrifugal fan positioned inside said cooling windows and fixed to one end of said rotor;
   wherein the peripheral wall of said housing is provided with guide wall parts positioned between circumferentially adjacent cooling windows to axially extend and define the direction of the cooling wind blown out of said cooling windows and support parts positioned between circumferentially adjacent cooling windows to extend in an axial direction of said housing, said support parts each having an inner peripheral portion proximate to said fan and a projecting portion projecting from said housing, and being formed circumferentially with a width wider than that of said guide wall parts; and
   said guide wall parts including first guide wall parts located in the vicinity of forward ends of said support parts in a rotating direction of said fan and second guide wall parts located in the vicinity of backward ends of said support parts in the vicinity of backward ends of said support parts in the rotating direction of said fan, an angle of inclination of said first guide wall parts with respect to a radial direction of said housing being larger than an angle of said second guide wall parts;
   wherein cooling windows between said first guide wall parts are for discharging air blocked by an inner peripheral portion of a corresponding one of said support parts; and
   cooling windows between said second guide wall parts are for discharging air so that it is not blocked by a projecting portion of a corresponding one of said support parts.

2. A rotary electric machine according to claim 1, wherein:
   a peripheral wall of said housing is provided with a plurality of said cooling windows and said guide wall parts between two of said support parts; and
   a circumferential width of said cooling windows is wider in an intermediate area between said support parts than in the vicinity of said support parts.

3. A rotary electric machine according to claim 1, wherein:

the peripheral wall of said housing is provided with a plurality of said cooling windows and said guide wall parts between two of said support parts; and
the angle of inclination of said guide wall parts becomes gradually smaller from the vicinity of the forward ends of said support parts in the rotating direction of said fan towards the vicinity of the backward ends of said support parts in the rotating direction of said fan.

4. A rotary electric machine according to claim 1, wherein:
   the peripheral wall of said housing is provided with a plurality of said cooling windows and said guide wall parts between two of said parts; and
   said plurality of cooling windows axially extend from the peripheral wall of said housing to the end thereof and the axial length of said cooling windows is set to be longer in the intermediate area between said support parts than in the vicinity of said support parts.

5. A rotary electric machine according to claim 1, wherein:
   said angle of inclination of said guide wall parts is set at an angle of cooling wind blown out from said centrifugal fan at a prescribed rotational speed; and
   said prescribed rotational speed is a rotational speed of said machine when air blown out from said machine under full load operation has a highest temperature.

6. A rotary electric machine according to claim 1, wherein said support parts each accommodate a fastening means for joining portions of said housing together.

7. A rotary electric machine comprising:
   a housing including a pair of generally cylindrical frames fastened to each other by fastening parts disposed thereon, said frames including a cylindrical peripheral wall;
   a stator fixed to said housing;
   a rotor rotatably supported in said stator by said housing; and
   a centrifugal fan fixed to one end of said rotor and positioned inside said frame;
   wherein a portion of said cylindrical peripheral wall forms said fastening part, said fastening part having a portion axially extending thereon, and at least two cooling windows positioned outside said centrifugal fan and positioned adjacent to said fastening part respectively on a forward side and a backward side in a rotating direction of said centrifugal fan;
   said fastening part includes a forward side wall and a backward side wall respectively defining said cooling windows with different inclination angles relative to a radial direction of said centrifugal fan;
   an inclination angle of said forward side wall is larger than an inclination angle of said backward side wall;
   one of said at least two cooling windows positioned adjacent to said forward side of said fastening part is for discharging air blocked by said portion of said peripheral wall forming said fastening part; and
   one of said at least two cooling windows positioned adjacent to said backward side of said fastening part is for discharging air so that it is not blocked by said axially extending portion of said fastening part.

8. A rotary electric machine according to claim 7, wherein:
   said cylindrical peripheral wall further defines a plurality of cooling windows positioned on both sides of said fastening part;

said cylindrical peripheral wall of said frame has a plurality of guide wall parts positioned between circumferentially adjacent ones of said cooling windows and axially extending therebetween to define a direction of cooling wind blown out of said cooling windows; and an inclination angle of a guide wall part in said plurality of guide wall parts which is in a vicinity of said forward side of said fastening part is larger than an inclination angle of a guide wall part in said plurality of guide wall parts which is in a vicinity of said backward side of said fastening part.

9. A rotary electric machine according to claim 7, wherein said cylindrical peripheral wall of said frame has a plurality of said fastening parts circumferentially spaced apart from one another.

* * * * *

UNITED STATES PATENT AND TRADEMARK OFFICE
CERTIFICATE OF CORRECTION

PATENT NO.     : 5,650,675
DATED          : July 22, 1997
INVENTOR(S)    : KANAYA, et al It is certified that error appears in the above-identified patent and that said Letters Patent is hereby corrected as shown below:

[75] Inventors: Please change "Kazuyoshi Kanaya" to --Kazuyoshi Konaya--

Signed and Sealed this

Fifth Day of January, 1999

Attest:

Attesting Officer

*Acting Commissioner of Patents and Trademarks*